(12) United States Patent
Engelbrektsson (10) Patent No.: US 10,781,931 B2
(45) Date of Patent: Sep. 22, 2020

(54) ACTUATOR AND METHOD FOR VALVE TYPE RECOGNITION

(71) Applicant: IMI Hydronic Engineering International SA, Eysins (CH)

(72) Inventor: Anders Engelbrektsson, Borås (SE)

(73) Assignee: IMI HYDRONIC ENGINEERING INTERNATIONAL SA, Eysins (CH)

( * ) Notice: Subject to any disclaimer, the term of this patent is extended or adjusted under 35 U.S.C. 154(b) by 0 days.

(21) Appl. No.: 16/069,045

(22) PCT Filed: Dec. 9, 2016

(86) PCT No.: PCT/EP2016/080477
§ 371 (c)(1),
(2) Date: Jul. 10, 2018

(87) PCT Pub. No.: WO2017/121554
PCT Pub. Date: Jul. 20, 2017

(65) Prior Publication Data
US 2019/0017623 A1 Jan. 17, 2019

(30) Foreign Application Priority Data
Jan. 12, 2016 (EP) .................................... 16150903

(51) Int. Cl.
*F16K 31/04* (2006.01)
*F16K 37/00* (2006.01)
*F16K 31/44* (2006.01)

(52) U.S. Cl.
CPC .............. *F16K 31/04* (2013.01); *F16K 31/44* (2013.01); *F16K 37/0041* (2013.01); *Y10T 137/8242* (2015.04)

(58) Field of Classification Search
CPC .. F16K 37/0083; F16K 31/04; F16K 37/0041; Y10T 137/8242
See application file for complete search history.

(56) References Cited

U.S. PATENT DOCUMENTS

| 5,318,272 A | 6/1994 | Smith |
| 5,711,507 A | 1/1998 | Berget et al. |

(Continued)

FOREIGN PATENT DOCUMENTS

| CN | 202252306 U | 5/2012 |
| CN | 105221828 A | 1/2016 |

(Continued)

OTHER PUBLICATIONS

Office Action dated Feb. 25, 2019, by the State Intellectual Property Office of the People's Republic of China in corresponding Chinese Patent Application No. 201680078734.9, (7 pages).

(Continued)

*Primary Examiner* — Atif H Chaudry
(74) *Attorney, Agent, or Firm* — Buchanan Ingersoll & Rooney P.C.

(57) ABSTRACT

A method for valve type recognition of a valve connected to an actuator, said valve being one of a first valve type and a second or further valve type. The actuator includes an actuator spindle which can be operatively connected to a valve rod. If the maximum allowable stroke of the actuator spindle is the same, or smaller than, a reference value then it is determined that the valve connected to the actuator is of the first valve type. If the maximum allowable stroke is larger than said reference value, the valve is determined to be of the second valve type. An actuator is provided for use in such a method.

15 Claims, 7 Drawing Sheets

(56) References Cited

U.S. PATENT DOCUMENTS

| | | | |
|---|---|---|---|
| 5,906,222 A | | 5/1999 | Faulstich |
| 6,092,783 A | * | 7/2000 | Scharnowski ..... G05D 16/2022 |
| | | | 251/129.07 |
| 2005/0126516 A1 | | 6/2005 | Lolli et al. |
| 2011/0226975 A1 | * | 9/2011 | Buse .................. F16K 1/36 |
| | | | 251/129.15 |
| 2012/0325322 A1 | | 12/2012 | Li et al. |
| 2013/0056658 A1 | | 3/2013 | Borchgrevink et al. |
| 2014/0305525 A1 | | 10/2014 | Le Moing et al. |
| 2014/0326908 A1 | * | 11/2014 | Schober .............. F15B 13/0444 |
| | | | 251/129.04 |
| 2015/0345991 A1 | | 12/2015 | Kageyama et al. |
| 2015/0377383 A1 | | 12/2015 | Feinauer et al. |

FOREIGN PATENT DOCUMENTS

| | | |
|---|---|---|
| DE | 36 38 844 A1 | 5/1988 |
| EP | 2 792 919 A1 | 10/2014 |
| JP | 5912192 B2 | 4/2016 |
| WO | WO 93/25832 A1 | 12/1993 |
| WO | WO 03/054649 A1 | 7/2003 |
| WO | WO 2011/021093 A1 | 2/2011 |

OTHER PUBLICATIONS

International Search Report (PCT/ISA/210) dated Feb. 22, 2017, by the European Patent Office as the International Searching Authority for International Application No. PCT/EP2016/080477.

Written Opinion (PCT/ISA/237) dated Feb. 22, 2017, by the European Patent Office as the International Searching Authority for International Application No. PCT/EP2016/080477.

Office Action (The Second Office Action) dated Nov. 12, 2019, by the China National Intellectual Property Administration in corresponding Chinese Patent Application No. 201680078734.9, and an English Translation of the Office Action. (15 pages).

* cited by examiner

ACTUATOR AND METHOD FOR VALVE TYPE RECOGNITION

TECHNICAL FIELD OF THE INVENTION

The present inventive concept relates to a method for valve type recognition of a valve connected to an actuator. It also relates to an actuator for controlling movement of a valve rod in a valve to which the actuator is connectable.

BACKGROUND OF THE INVENTION

Fluid distribution systems, for e.g. heating, cooling and water supply are designed to feed a fluid from a source to a consumption point. Each consumption point typically has a calculated and designed flow or differential pressure requirement. However, depending on the type of hydronic system, the flow requirement is often variable over time and can change with factors like seasonality (e.g. summer or winter), that changes the load from the consumption points, temperature changes of the system fluid, changes in consumption of the system fluid (e.g. for drinking water).

Control valves are frequently used in fluid distribution systems and have a variable opening such that the flow rates can be controlled. An actuator for controlling the position of such a valve is often provided. Such an actuator is normally driven by means of a motor which drives an actuator spindle. The actuator spindle is in turn connected to a valve rod for controlling the opening degree of the valve.

Control valves come in various dimensions with various fluid characteristics and may therefore be operated in different ways. For instance, in the fully closed position of a valve, a valve closing member (such as a valve plug or cone) should sufficiently seal against a valve seat (some minor leakage flow may be acceptable), and should therefore be pressed with a certain force against the valve seat to counteract the fluid pressure (and any pressure from a biasing spring, if present) acting to open the valve. A larger control valve may need a larger counteracting force in order to maintain the fully closed position of the valve than what may be needed for a smaller control valve. Therefore, when a person connects an actuator to a valve, he/she may need to check what type of valve the actuator is connected to and provide the actuator with appropriate settings based on the type of valve. If the person does not provide appropriate settings to the actuator, it may not operate the valve in a satisfactory manner. For instance, there may be a risk of improper sealing if too low force is applied from the actuator spindle via the valve rod, or the valve may be damaged if too high force is applied. Furthermore, for valves having designed flow characteristics, such as an EQM function, the resulting flow through the valve may be improperly controlled if the actuator settings are incorrect.

Thus, it would be desirable to provide an actuator and a method which alleviates the above mentioned drawbacks of the currently used technology.

SUMMARY OF THE INVENTION

An object of the present invention is to provide a method and an actuator which alleviate the above mention drawbacks. This and other objects, which will become apparent in the following, are accomplished by a method and an actuator as defined in the accompanying independent claims and by methods and actuators defined in various aspects of the invention presented in this disclosure.

The present inventive concept is based on the insight that instead of manually providing an actuator with appropriate settings after a person has checked what valve type the actuator is or will be connected to, an actuator itself may be used to automatically determine the type of valve.

The present inventive concept is also based on the insight that within a group of different valve types the different valve types may, for instance, differ in the length of stroke of the valve rod, the spatial position of the valve rod in the fully closed and/or fully open position, and that these differences may be detected by an actuator connected to a valve being a valve type within such a group of different valve types.

According to a first aspect of the inventive concept, there is provided a method for valve type recognition of a valve connected to an actuator, said valve having a valve rod movable by an actuator spindle of the actuator, said valve being one of a first valve type and a second or further valve type, wherein said actuator spindle of the connected actuator has a maximum allowable stroke defined by a displacement of the actuator spindle between a first end position and a second end position, said second end position being defined as the position of the actuator spindle when being operatively connected to said valve rod in a fully closed position of the valve, said method comprising the steps of:

determining for the connected actuator if the maximum allowable stroke of the actuator spindle is larger than a reference value, determining that the valve connected to the actuator is of the first valve type if the maximum allowable stroke of the actuator spindle is the same, or smaller than, said reference value, determining that the valve connected to the actuator is of a second or further valve type if the maximum allowable stroke of the actuator spindle is larger than said reference value.

This aspect of the invention is based on the realization that it is possible to program an actuator with a reference value. That reference value may be the maximum allowable stroke of the actuator spindle when the actuator is connected to a first valve type. This means that when the actuator is connected to a valve and the actuator spindle is allowed to make a larger stroke than said reference value, it can then be concluded that the actuator has been connected to a different valve type than said first valve type. Likewise if the actuator is designed to be connectable to more than two valve types, for instance to three, four or more valve types, then the actuator may be programmed with several reference values, one for each maximum allowable stroke available for a respective connected valve type.

Typically, although not necessarily, the smallest valve type will have the smallest maximum allowable stroke for the actuator spindle. Thus, if the actuator is designed to be connected to one of a first and a second valve type the actuator can detect, when it is connected to a valve, if the maximum allowable stroke is larger than the reference value or not. If it is not larger, it is determined that the actuator has been connected to the first or smallest valve type. If the maximum allowable stroke is larger, then it is determined that the actuator has been connected to the second or larger valve type.

Based on this determination the actuator may be programmed to adapt how it operates on the connected valve. For instance, the actuator may adapt parameters such as applied force of the actuator spindle, closing force, speed of the actuator spindle and/or the relation between a signal received by the actuator and the applied actuator spindle displacement (e.g. being linear for one valve type and of another type of characteristic for another valve type).

The different operating modes may thus depend on the valve type. For instance, different valve type can be valves with different flow capacity, different closing force requirement, different Kv-to-stroke characteristic curves, different hydronic functions or combinations of hydronic functions. As the actuator detects the valve type it may automatically adapt its control behaviour to the detected valve type.

According to at least some example embodiments the actuator is adapted to be connected to hydronic valves, but in other embodiments the actuator may be adapted to be connected to other type of actuator-controlled valve for fluids, be it gas (e.g. air) or liquid.

Although in the present disclosure and drawings, linearly/axially moving actuator spindles are shown, the present inventive concept is also functional for rotating spindles. Thus, it should be understood that the stroke and the maximum allowable stroke of the actuator may be a linear stroke or a rotational stroke.

It should also be understood that the present inventive concept is applicable to push actuators as well as to push/pull actuator. In a push actuator, the actuator spindle is commonly designed to push the valve rod towards the closed position of the valve. If the actuator spindle is retracted, the valve rod will move towards the open position of the valve by means of a biasing spring or by means of the fluid pressure (i.e. biasing spring is not necessarily present in a valve operated by a push actuator). In a push/pull actuator, the biasing spring is not necessary; the actuator spindle will move the valve rod in both the closing and the opening direction. If a push actuator is connected to a valve and the valve is moved to its fully open position, the actuator spindle does not have to be in contact with the valve rod. The actuator spindle is allowed to leave the valve rod and continue its motion to the first end position. Thus, for a push actuator connected to a valve there will (normally) be a gap between the valve rod and the actuator spindle after the valve rod has been displaced to the fully open position of the valve.

It should be noted that in some designs (if the valve is biased towards the closed position) the actuator spindle of the push actuator can be adapted to push the valve rod towards the open position of the valve.

When the actuator is used in a method for valve type recognition, a recognition process may start by moving the actuator spindle from its second end position to its first end position. The second end position is the most advanced position allowed by the connected valve, i.e. the second end position of the actuator spindle is obtained when the valve rod is in a fully closed position of the valve. In this way the maximum allowable stroke of the valve may be determined and may be compared with one or more reference values, which are suitably stored in the actuator. However, in this example embodiment and in other example embodiments said one or more reference values to which the maximum allowable stroke is compared, may be stored remotely in a central unit of, for instance, a building management system (BMS), in which case the actuator will send a signal representative of the determined maximum allowable stroke to said central unit, and the latter will compare it with one or more reference values to determine the valve type. The actuator may then, based on the determination of the control unit, set itself in the actuator operating mode which is appropriate for the determined valve type.

In at least some example embodiments, instead of (or in addition to) storing said one or more reference values in a central unit of a building management system, said one or more reference values to which the maximum allowable stroke is compared, may be stored in a software application operatively connected to the actuator through a portable actuator configuration unit. The actuator will send a signal representative of the determined maximum allowable stroke to said portable actuator configuration unit, and its software will compare it with one or more reference values to determine the valve type. The actuator may then, based on the determination, set itself in the actuator operating mode which is appropriate for the determined valve type. Such a portable actuator configuration unit may be an external portable device connectable with a signal transmitting wire to the actuator. The portable actuator configuration unit may comprises an energy storage unit for supplying power to the portable actuator configuration unit, and a transmitting unit for transmitting control signals to the actuator via said signal transmitting wire in order to control the actuator. The signal transmitting wire may, for instance be a USB (Universal Serial Bus) cable. The utilization of USB cables allows sending and receiving of signals or digital information to/from the actuator.

In some example embodiments of the method, a recognition process may start by moving the actuator spindle from its first end position, which is normally its most retracted position, in a direction towards its second end position, which is when the valve rod is in a fully closed position of the valve. If during this movement the actuator passes a reference value, it will know it is not the first valve type that has been connected, and may for its continued movement adapt its operating mode (e.g. force or speed, etc). If there are more than two possible valve types, the actuator may pass another reference value during its movement and thus concluding that it is not a second valve type either which is connected, but instead a third or further valve type. Again the operating mode may be adapted during the travel of the actuator spindle. From the above, it must be understood that it is not necessary to measure the actual maximum allowable stroke of the actuator spindle, it may be enough to check if the stroke is larger than (i.e. has moved past) a reference value or not. In other words the actuator may be pre-programmed to switch to a different operating mode (such as a higher applied force or speed) for each one or more reference values the actuator spindle passes. Thus, this switching of operating mode may be made simultaneously with the movement of the actuator spindle.

As mentioned previously, the actuator may be designed to be operable with a first valve type in which the allowable displacement of the valve rod is smaller than the allowable displacement of the valve rod in a second valve type with which the actuator is also operable. In such case, but also in other cases, reference value may be set based on the maximum allowable stroke of the first valve type. Typically the reference value may be equal to or larger than the maximum allowable stroke of the first valve type. This means that, in a subsequent operation, when connected to a different valve, if the then connected actuator has a maximum allowable stroke for the actuator spindle which exceeds the reference value, it can be determined that the now connected valve is not the first valve type, but rather the second or a further valve type.

The above is at least partly reflected in at least one example embodiment, according to which said step of determining if the maximum allowable stroke of the actuator spindle is larger than a reference value is preceded by the step of:

determining for the first valve type, a first type maximum allowable stroke of the actuator spindle between said first and said second end positions, the first type maximum allowable stroke being the same as, or smaller than, said reference value.

This step may normally be done in production of the actuator when it is designed to which valve types it should be connectable. It is, however, conceivable to make this step after production, for instance, as part of a calibration process of a newly acquired actuator.

Due to small variations and tolerances among the dimensions of the various components in the actuator and valve, it may be suitable to set the reference value to be a slightly higher value than the first type maximum allowable stroke. If the actuator is designed to be connected to three or more different valve types, then two or more reference values may be set, and the setting of the reference values may suitably be a value slightly higher than the respective maximum allowable stroke.

According to at least one example embodiment, the method further comprises the step of:

determining in said second end position and for the first valve type, a reference position of an end surface of the valve rod being in contact with said actuator spindle. Thus, if the end surface of the actuator is an interface at which the actuator spindle (or some secondary part connected to the actuator spindle) engages or contacts with the valve rod, such an end surface provides a suitable reference position which can be used for setting a reference value. Again, tolerances may suitably be taken into account when setting the reference value.

In at least some example embodiments said reference position may have an associated marking in the actuator. In other words, the marking may be located at a plane perpendicular to the spindle axis, the plane being located at an interface between the actuator spindle and the valve rod (of the first valve type) when the actuator spindle is in its second end position (i.e. valve fully closed). Suitably, the marking may be located slightly below the plane to take into account any manufacturing tolerances. The actuator spindle may be provided with a sensor which can detect said marking. When a person connects the actuator to a valve, the actuator may detect if the spindle passes said marking or not. If the spindle has not passed the marking, the actuator will determine it the valve to be of a first valve type. However, if the sensor detects that the actuator spindle has moved past said marking, it is determined that the actuator has been connected to a second or further valve type. It is, of course, conceivable to have the marking on the actuator spindle and a fixed sensor in the actuator housing.

Different types of sensors are conceivable, such as optical, ultrasound, electromagnetic etc.

From the above example embodiments, it should thus be understood if the actuator is connected to the second valve type, the actuator spindle is allowed to move past said reference position.

When an actuator is connected to a valve, the actuator spindle can be advanced in a direction towards the valve and be retracted in a direction away from the valve. Although an actuator and a valve can be mounted in various orientations in a room, e.g. depending on the location of a pipe to which the valve is connected, for ease of reference, in particularly for a linearly/axially movable actuator spindle, the most retracted position of the actuator spindle will herein be referred to as its top end position, while the most advanced position allowed by the connected valve will herein be referred to as its lower end position.

Thus, according to at least one example embodiment, said first end position is a top end position.

Similarly, according to at least one example embodiment, said second end position is a bottom end position.

The top end position is suitably defined by a mechanical stop element against which the actuator spindle (or a component connected thereto) abuts to stop a retracting movement of the actuator spindle. However, it would be conceivable to have an electronically controlled stop means, in which case the top end may be designed individually for each actuator, by appropriate programming of the electronically controlled stop means.

As previously mentioned, different valve types may need different types of operating modes. Thus, according to at least one example embodiment, the method further comprises the step of:

operating the actuator in a first mode of operation if the maximum allowable stroke of the actuator spindle is the same, or smaller than, said reference value.

In other words, if it is determined that the valve to which the actuator is connected it of the first valve type, a first mode of operation is performed by the actuator. Such a mode of operation may, for instance, be a certain closing force, speed and/or the relation between a signal received by the actuator and the applied actuator spindle displacement. One such example is that if the first valve type is of a relatively small valve type, the closing force for keeping the valve in the fully closed position (with or without a certain minor leakage flow being accepted) may be a relatively low closing force. A relatively larger second valve type may need a larger closing force, and should therefore be operated in a different (second) mode of operation.

Thus, according to at least one example embodiment, the method further comprises the step of:

operating the actuator in a second mode of operation if the maximum allowable stroke of the actuator spindle is larger than said reference value.

If the actuator is adapted to be fitted to more than two different valve types, there may be further operating modes.

Thus, according to at least one example embodiment, the actuator is adapted to be connected to one of N number of different valve types, N−1 reference values are set, one for each one of the first valve type to the N−1:th valve type.

According to at least one example embodiment, the method comprises the step of:

determining for the connected actuator if the maximum allowable stroke of the actuator spindle is larger than one or more of said N−1 reference values, determining that the valve connected to the actuator is of the first valve type if the maximum allowable stroke of the actuator spindle is the same, or smaller than, the first reference value, determining that the valve connected to the actuator is of the N:th valve type if the maximum allowable stroke of the actuator spindle is larger than the N−1:th reference value, otherwise, determining which reference value of said N−1 set reference values is closest to the maximum allowable stroke of the actuator spindle, and identifying the valve type which is associated with said determined reference value.

As exemplified above the reference value may be based on a reference position, which may be embodied as sensor-detectable marking in the actuator housing or on the actuator spindle. However, other possibilities are also conceivable. For instance, the reference value may be based on a rotational count of a gear connected to a motor driving the actuator spindle. For instance, a maximum allowable stroke may correspond to a certain number of full and/or partial rotations of such a gear.

According to at least one example embodiment, said reference value is a reference stroke. If several reference values are set, each reference value may correspond to a reference stroke which is characteristic of the spindle of the actuator when connected to a respective valve type.

According to a second aspect of the inventive concept, there is provided a method for valve type recognition of a valve connected to an actuator, said valve having a valve rod movable by an actuator spindle of the actuator, said valve being one of a first valve type and a second or further valve type, wherein said actuator spindle of the connected actuator has a maximum allowable stroke defined by a displacement of the actuator spindle between a first end position and a second end position, said second end position being defined as the position of the actuator spindle when being operatively connected to (for instance, in contact with) said valve rod in a fully closed position of the valve, wherein for at least a part of the maximum allowable stroke the actuator spindle is in contact with the valve rod, said method comprising the steps of:

setting, for the connected actuator, the actuator spindle at a first reference position, moving the actuator spindle away from the first reference position in a direction towards a second reference position, determining if the actuator spindle, is able to move past the second reference position, determining that the valve connected to the actuator is of the first valve type if the actuator spindle is not able to move past the second reference position, determining that the valve connected to the actuator is of a second or further valve type if the actuator spindle is able to move past the second reference position.

Thus, the mutual displacement of the actuator spindle and the valve rod is compared to the separation of the first and second reference positions. For a push actuator the actuator spindle is not always connected to the valve rod. For instance, when retracting the actuator spindle form its second end position (fully closed valve) it will eventually leave the valve rod when the valve rod has reached the fully closed position of the valve. Thus, when the actuator spindle has left the valve rod, creating a gap, there is no longer a mutual displacement.

When producing or programming the actuator the first reference position may be defined based on a case when the actuator has been connected to a valve of a first valve type. The first reference position may be set at any predefined point proximally of (retracted from) the second end position. Depending on the differences between the different valve types that the actuator is designed to be connectable to, the second reference position may be placed at different locations. For instance, the second reference position may be set at an interface area between the valve rod and the actuator spindle chosen in a state when a valve of the first valve type is in its fully open position and the actuator spindle is still connected to the valve rod (i.e. the spindle has not left the rod). If the mutual travel is detected to be beyond the second reference position, it is determined that a connected valve is of the second or further valve type. Having the second reference position proximally of the first reference position means that the location of the valve seat in the two or more valve types are irrelevant form determining the valve type. Indeed, the valve types may have variable valve seat heights, for instance, to allow balancing of the different valves, which would have a corresponding effect as setting lift limitations to valve rods.

If, however, the first and second valve types to which the actuator is designed to be connectable have different valve seat heights and the actuator spindle will have different second end positions depending on which one of the valve types it has been connected to, in such case the second reference position may suitably be defined at an area of the second end position of the actuator spindle when connected to a valve of a first valve type. Thus, if the actuator spindle, moving from the first reference position and is allowed to push the valve rod, so that the actuator spindle passes the second reference position, it is determined that the actuator is now connected to a valve of the second (or further valve type).

Setting the first reference position to correspond to a position which is located proximally of the second end position of the actuator spindle when the actuator is connected to a valve of a first valve type allows for a valve type recognition to be made by advancing the actuator spindle or by retracting the actuator spindle from the first reference position. Both directions are possible.

However, in example embodiments in which the actuator spindle is only intended to be retracted from the first reference position (i.e. moved in a direction towards its first end position), said first reference position may be located more distally than what has been described above. Thus, in at least some example embodiments, the first reference position may be defined at any location passed during the maximum allowable stroke. In other words, the first reference position may be anywhere from the retracted first end position to the advanced second end position of the actuator spindle, as long as it has been predefined before the recognition process starts. Thus, the first reference position may, in at least some example embodiments, even be located at the second distal end of the actuator spindle (the second distal end may be the second distal end of an actuator when connected to a valve of the first valve type or to a valve of the second valve type).

It should be understood that the second aspect of the inventive concept may include any features included and steps performed in any one of the embodiments presented in relation to the first aspect of the inventive concept, and vice versa.

According to a third aspect of the inventive concept, there is provided an actuator for controlling movement of a valve rod in a valve to which the actuator is operatively connectable, said actuator comprising:

an actuator spindle, wherein, when said actuator is connected to a valve, said actuator spindle is arrangeable in a first end position and in a second end position, said second end position being defined as the position of the actuator spindle when being in contact with the valve rod in a fully closed position of the valve, wherein the maximum allowable stroke for the actuator when connected to the valve is defined by a displacement of the actuator spindle between the first end position and the second end position;

means for determining if the maximum allowable stroke of the actuator spindle is larger than a reference value.

According to at least one example embodiment the actuator comprises a control unit. According to at least one example embodiment, said determining means comprises a control unit in which said reference value is stored. However, in other embodiments, the reference value may be stored in a memory unit separate from the control unit.

According to at least one example embodiment, said determining comprises at least one of a gear arrangement and a motor, which may communicate with the control unit by wire or by wireless communication. According to at least one example embodiment said determining means comprises at least one sensor, such as two, three or more sensors, which may communicate with the control unit by wire or by wireless communication.

According to at least one example embodiment, the actuator is adapted to:

operate in a first mode of operation if the determined maximum allowable stroke of the actuator spindle is the same, or smaller than, said reference value, operate in a second mode of operation if the maximum allowable stroke of the actuator spindle is larger than said reference value.

Suitably, the control unit is adapted to control the actuator to operate in one of said first and second modes of operation depending on the determined maximum allowable stroke.

The different modes of operation are suitably adapted to the different valve types that the actuator is adapted to be connected to. The different valve type can be valves with different flow capacity, different closing force requirement, different Kv-to-stroke characteristic curves, different hydronic functions or combinations of hydronic functions. The actuator may then by detection automatically adapt its control behaviour to the detected valve type.

According to at least one example embodiment, in said first mode of operation of the actuator is adapted to apply via the actuator spindle a first force (such as a first closing force) to the valve rod, and in said second mode of operation the actuator is adapted to apply via the actuator spindle a second force (such as a second closing force) to the valve rod, wherein said second force is greater than said first force.

According to at least one example embodiment, in said first mode of operation the actuator is adapted to apply at least one of a first speed of the actuator spindle, a first control signal to actuator displacement function, and in said second mode of operation the actuator is adapted to apply at least one of a second speed of the actuator spindle, a second control signal to actuator displacement function.

A control signal may for instance be a signal ranging from 0 to 10 V. The actuator may be pre-programmed to relate the voltage of the signal to a certain displacement of the actuator spindle, e.g. 0 V is fully retracted actuator spindle, which 1 V is slightly advanced. The control signal to actuator displacement function may be designed differently for the different valve types.

It should be understood that the third aspect of the inventive concept may include any features included and steps performed in any one of the embodiments presented in relation to the first and/or second aspects of the inventive concept, and vice versa.

According to a fourth aspect of the inventive concept, there is provided a system comprising at least two valves of different valve types, an actuator operatively connectable via an actuator spindle to a valve rod of either one of the valves, wherein the maximum allowable stroke for the actuator spindle is smaller if the actuator is connected to a valve of a first valve type than if the actuator is connected to a valve of a second valve type, wherein the actuator comprises means to determine if the maximum allowable stroke of the actuator when connected to a valve is greater or not than the maximum allowable stroke of the actuator if connected to a valve of the first valve type.

It should be understood that the fourth aspect of the inventive concept may include any features included and steps performed in any one of the embodiments presented in relation to the first, second, and/or third aspects of the inventive concept, and vice versa.

According to a fifth aspect of the inventive concept there is provided a method of operating an actuator connected to a valve, said valve having a valve rod movable by an actuator spindle of the actuator, wherein said actuator spindle of the connected actuator has a maximum allowable stroke defined by a displacement of the actuator spindle between a first end position and a second end position, said second end position being defined as the position of the actuator spindle when being operatively connected to said valve rod in a fully closed position of the valve, said method comprising the steps of:

determining for the connected actuator if the maximum allowable stroke of the actuator spindle is larger than a reference value, operating the actuator in a first mode of operation if the maximum allowable stroke of the actuator spindle is the same, or smaller than, said reference value, operating the actuator in a second mode of operation if the maximum allowable stroke of the actuator spindle is larger than said reference value.

It should be understood that the fifth aspect of the inventive concept may include any features included and steps performed in any one of the embodiments presented in relation to the first, second, third and/or fourth aspects of the inventive concept, and vice versa.

DETAILED DESCRIPTION OF THE DRAWINGS

Figure 1A:
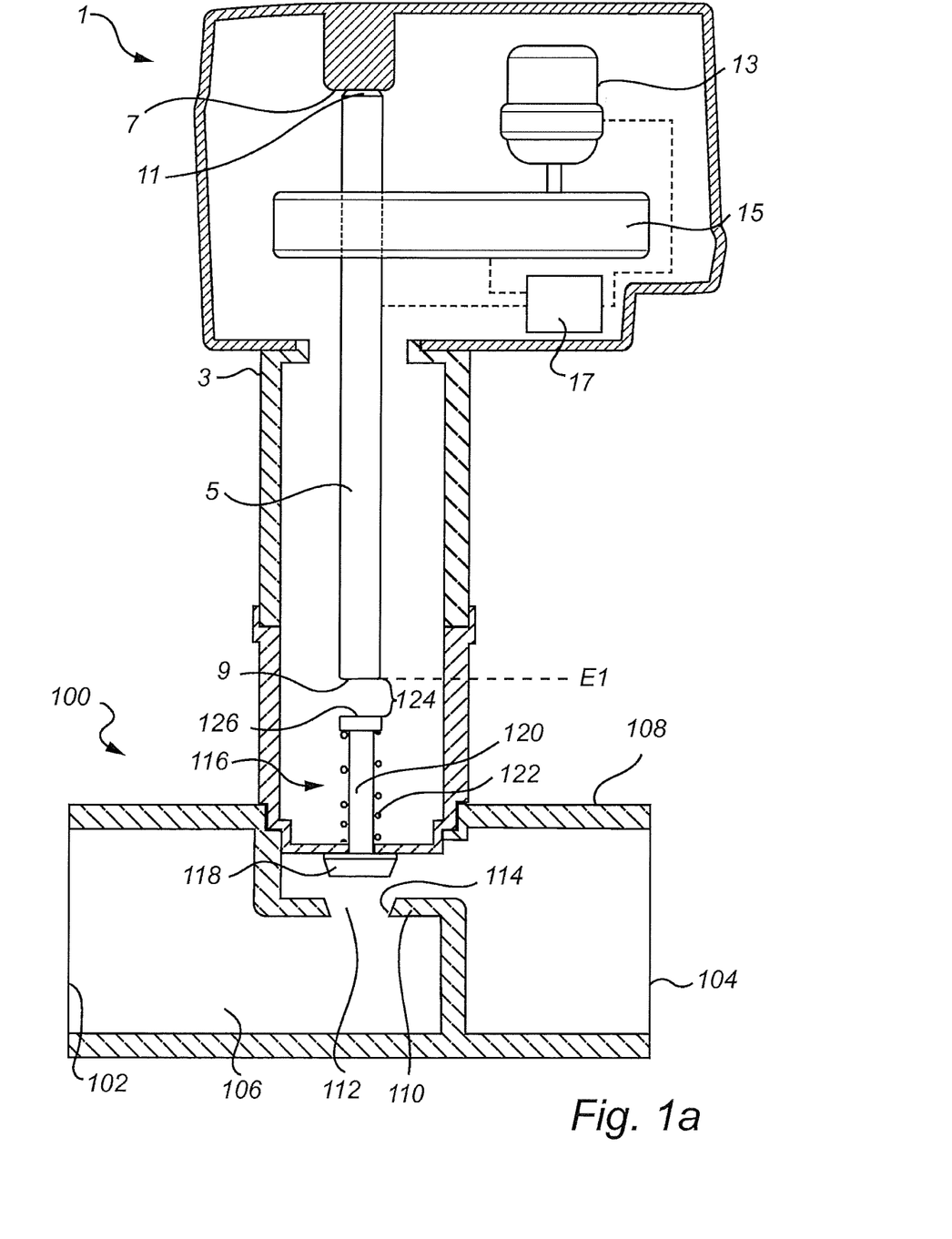
FIGS. 1a-1c illustrate schematically an actuator connected to a valve of a first valve type.
Figure 1B:
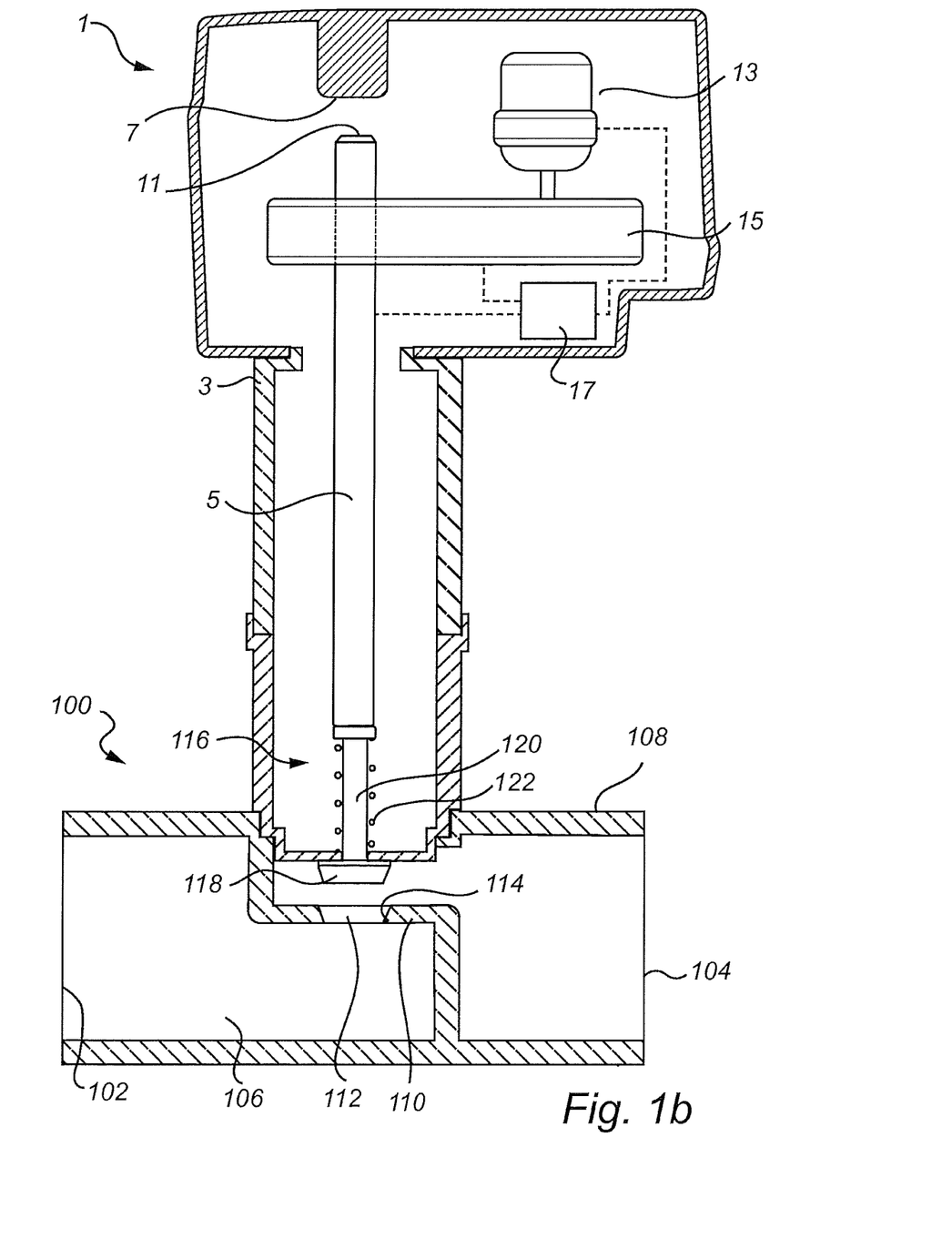
Figure 1C:
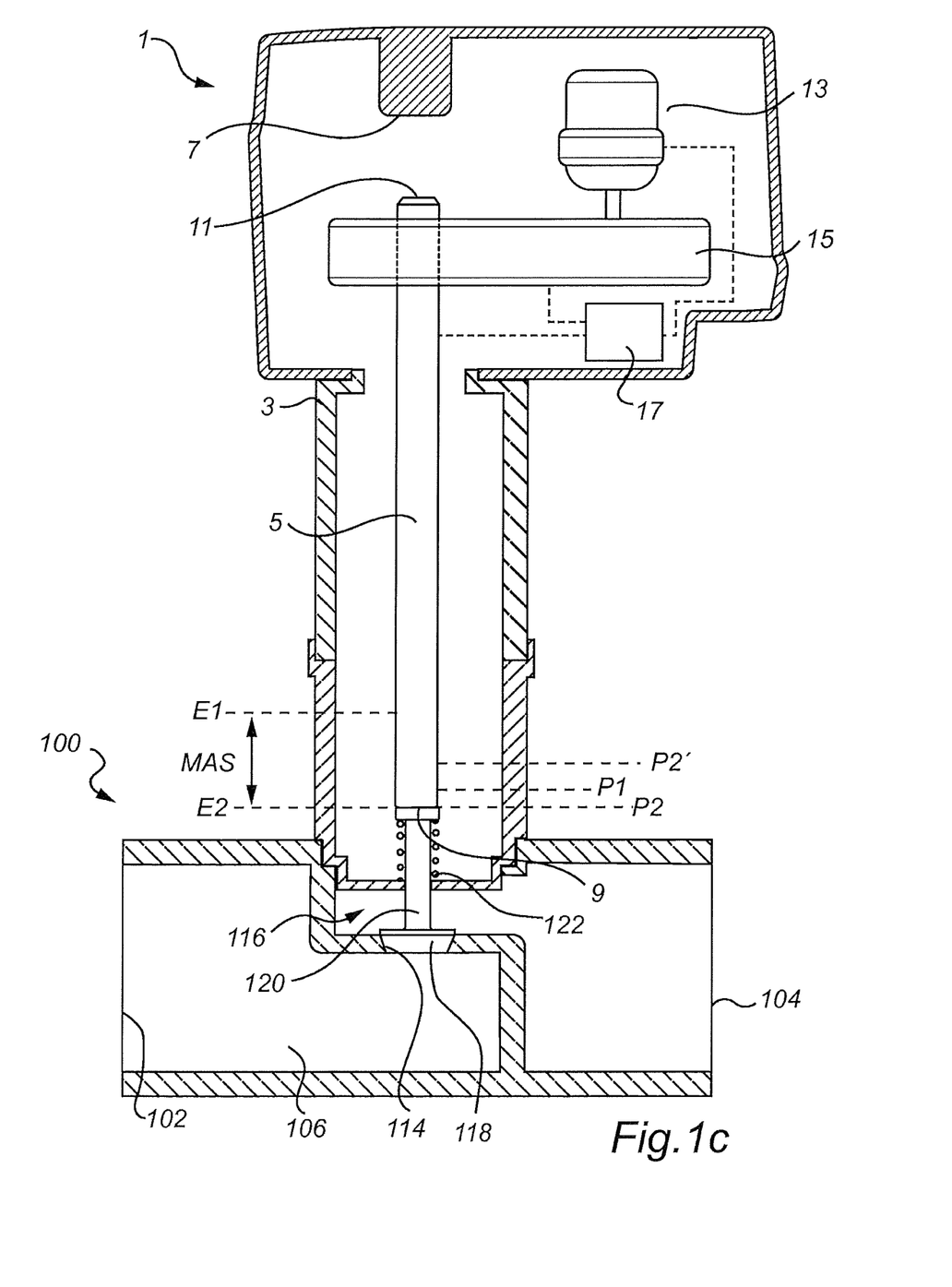

FIGS. 1a-1c illustrate schematically an actuator 1 connected to a valve 100 of a first valve type. The actuator 1 may be used in a method for valve type recognition in accordance with at least some example embodiments of the inventive concept. The valve 100 may suitably be a hydronic valve. However, the inventive concept is also applicable to other actuator-controlled valve for fluids, be it gas or liquid.

With reference to FIG. 1a the actuator 1 comprises an actuator housing 3. Inside the actuator housing there is an actuator spindle 5 which can be advanced in a direction towards a connected valve and retracted away from the valve. In the figure a mechanical stop 7 is exemplified for defining a retracted first end position E1 or top end position of the actuator spindle 5. The first end position E1 is here illustrated as the axial position of the distal end 9 of the actuator spindle 5 when the proximal end 11 of the actuator spindle 5 abuts the mechanical stop 7. However, the first end position could relate to any other defined area of the actuator spindle as long as the same area is used for defining the second end position of the actuator spindle 5.

The actuator spindle 5 is in driven by an operatively connected drive mechanism. In the example shown in the figure, the drive mechanism comprises inside the housing 3 a motor 13 connected to the actuator spindle 5 via a gear arrangement 15. The motor 13, for example an electrically driven motor, drives the gear arrangement 15 including, for instance a main gear wheel (not shown) which transfers its rotational movement into reciprocal movement of the actuator spindle 5.

Although not illustrated, the gear arrangement 15 may typically comprise a first gear wheel arranged in rotational connection with the motor 13, said main gear wheel directly connected with the actuator spindle 5, and at least one intermediate gear wheel arranged between the first gear wheel and the main gear wheel, the at least one intermediate gear wheel thus being arranged to transfer rotational movement from the first gear wheel to the main gear wheel. However, other gear arrangements are also conceivable, e.g. with fewer or more gear wheels.

The main gear wheel may have a central hole through which the actuator spindle 5 extends. The walls of the central hole may be provided with an internal thread which may cooperate with an external thread (not shown) provided on the actuator spindle 5. The main gear wheel does not move along its central axis. Since the main gear wheel is axially locked, the actuator spindle 5 is moved in the axial direction as the rotational movement of the main gear wheel is transferred to an axial movement of the actuator spindle 5 via the engagement of the internal thread of the main gear wheel and the external matching thread of the actuator spindle 5. In other words, as the main gear wheel rotates while being locked in the axial position, the rotational movement of the internal thread engaging with the external matching thread is transferred into an axial movement of the actuator spindle 5, as the internal thread of the main gear wheel exerts an axial force on the external matching thread of the actuator spindle 5. Thus it should be understood that the internal thread and the external matching thread have a matching lead and pitch. Of course, it should be understood that other means for moving the actuator spindle 5 are also conceivable.

The actuator 1 also has a control unit 17 which may be operatively connected to the motor 13, to the gear arrangement 15 and/or to the actuator spindle 5. The control unit 17 may communicate with the motor 13, the gear arrangement 15 and/or the actuator spindle 5 by wired communication and/or by wireless communication.

It should be noted that the valves in the figures are very general schematic representations merely intended to show an underlying principle of the inventive concept. In FIG. 1*a* the valve 100 has a fluid inlet 102 and a fluid outlet 104, and a passage 106 between the inlet 102 and the outlet 104. In this example embodiment, the valve 100 is illustrated as having a valve body 108 with a partition wall 110 provided with a through-hole 112. An area around the through-hole forms a valve seat 114. A valve closing member 116, in this embodiment illustrated as a plug 118 or a plate carried by a valve stem or valve rod 120, is adjustable in relation to the valve seat 114.

In FIG. 1*a*, the valve 100 is illustrated as provided with a biasing spring 122, urging the valve closing member 116 (including its plug 118 and rod 120) towards a fully open position of the valve 100.

The actuator 1 connected to the valve 100 is a push actuator. Thus, the actuator 1 can be used for moving the valve closing member 116 in a distal direction towards a closed position of the valve 100, while the spring 122 is biased to provide an opening force to the valve closing member 116, urging it to move in a proximal direction. Thus, it should be understood that in throughout this disclosure, for all aspects and embodiments, the terms "proximal" and "distal" are to be interpreted such that the actuator spindle 5 is located proximally of the valve rod 120, while the valve rod 120 is located distally of the actuator spindle 5.

FIG. 1*a* illustrates a first state in which the actuator spindle 5 is in its fully retracted position, i.e. its first end position E1. The valve closing member 116 is held in the fully open position of the valve 100. There is a gap 124 between the distal end 9 of the actuator spindle 5 and a proximal end 126 of the valve rod 120, i.e. in this first state they are not operatively connected to each other.

FIG. 1*b* illustrates a second state in which the actuator spindle 5 has been advanced and is now in contact with (or otherwise operatively connected to) the valve rod 120. The valve closing member 116 is still in the fully open position of the valve 100. It should be noted that this second state in FIG. 1*b* is also reached when the actuator spindle 5 is retracted from a more advanced position (such as a third state in FIG. 1*c*) and is just about to leave the valve rod 120 (FIG. 1*b*).

FIG. 1*c* illustrates the third state in which the actuator spindle 5 has pushed the valve rod 120 so that the valve closing member 116 has reached its fully closed position (with or without minor leakage flow being acceptable). The valve plug 118 has thus mated with the valve seat 114 to seal the through hole 112 (only visible in FIGS. 1*a*-1*b*) in the valve seat 114. The biasing spring 122 has been compressed. Since the valve rod 120 cannot be pushed further, the actuator spindle 5 has now reached its advanced second end position E2.

The actuator spindle 5 has a maximum allowable stroke MAS when the actuator 1 has been connected to the valve 100 of the first valve type. The maximum allowable stroke MAS is defined by the displacement of the actuator spindle between the first end position E1 of the actuator spindle 5 (FIG. 1*a*) and the second end position E2 of the actuator spindle 5 (FIG. 1*c*). It should be understood that the maximum allowable stroke MAS can be measured moving the actuator spindle 5 either from the first end position E1 to the second end position E2 or from the second end position E2 to the first end position E1, since the size of the displacement being the same irrespective of direction of displacement. It should be noted that in these figures the displacement is axial and linear. Thus, the maximum allowable stroke MAS is a certain stroke length. However, it should be understood that it would also be conceivable to have actuator spindles which rotate between two end positions, in which case the stroke may be a stroke angle or stroke arc length.

Figure 2A:
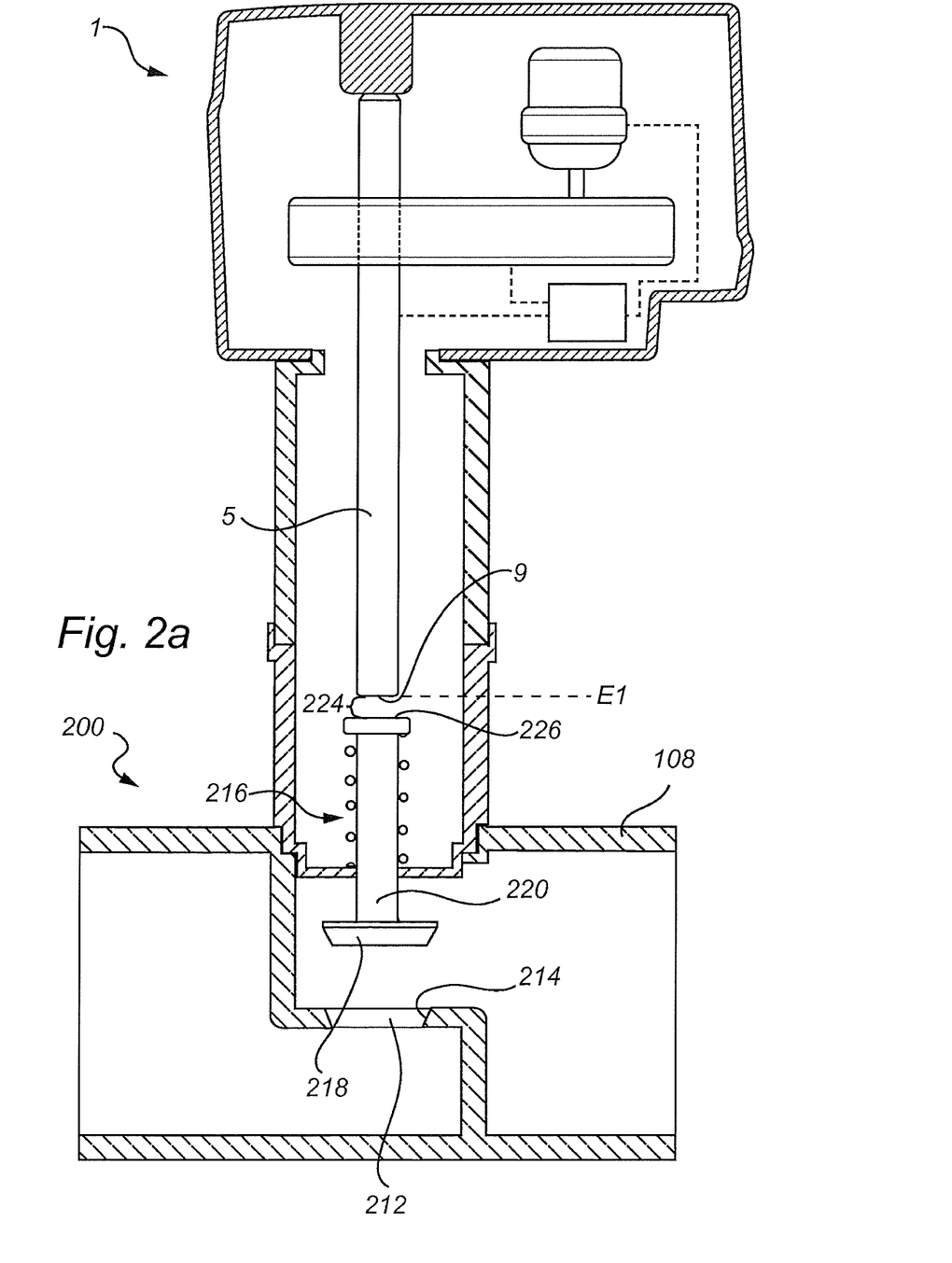
FIGS. 2a-2c illustrate schematically the same actuator connected to a valve of a second valve type.
Figure 2B:
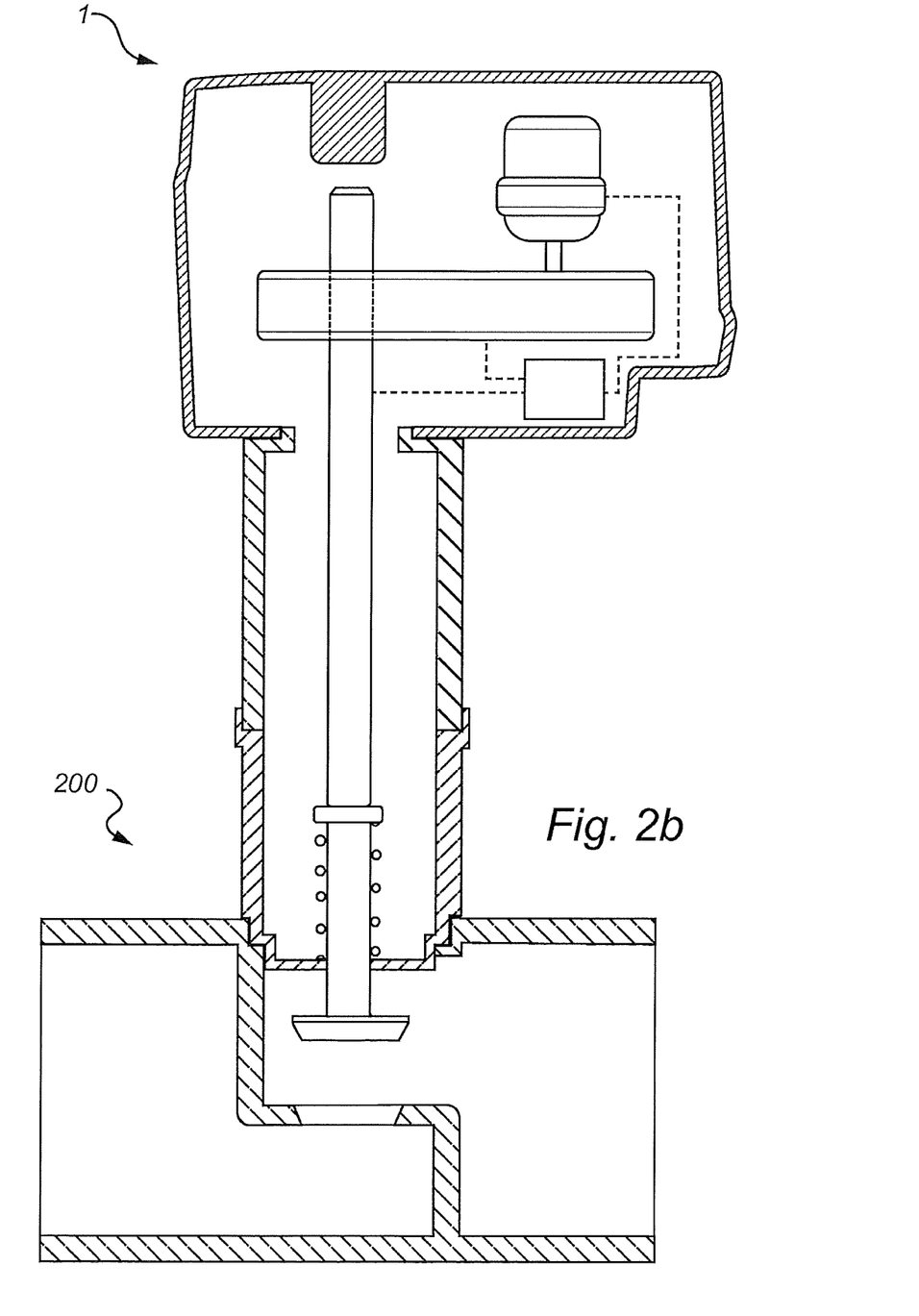
Figure 2C:
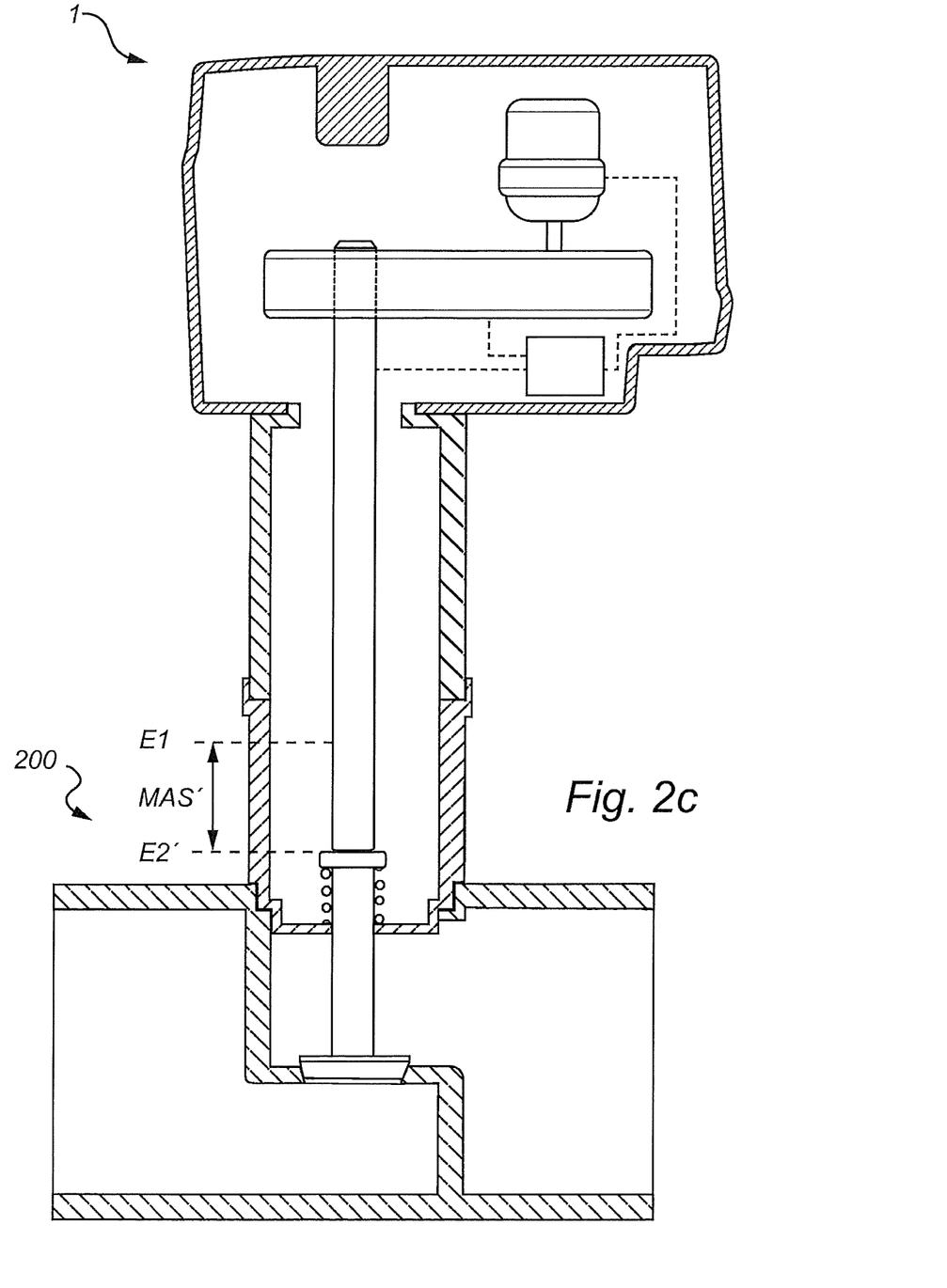

FIGS. 2*a*-2*c* illustrate schematically the same actuator 1 connected to a valve 200 of a second valve type. Thus, structural features of the actuator 1 are the same in FIGS. 1*a*-1*c* and FIGS. 2*a*-2*c*. As regards the valve 200 in FIGS. 2*a*-2*c* it is illustrated as being of a larger dimension. Compared to the valve 100 in FIGS. 1*a*-1*c*, the valve 200 in FIGS. 2*a*-2*c* has a larger through-hole 212 diameter and therefore a larger valve plug 218. The valve 200 of this second valve type also has a longer valve rod 220. When connected to the actuator 1, in the first state shown in FIG. 2*a*, the proximal end 226 of the valve rod 220 of the second valve type is positioned closer to the actuator spindle 5 than the proximal end 126 of the valve rod 120 of the first valve type (FIG. 1*a*). Thus, when the actuator spindle 5 is in its first end position E1, the gap 224 between the distal end 9 of the actuator spindle 5 and the proximal end 226 of the valve rod 220 is smaller for the second valve type (FIG. 2*a*) than the gap 124 present in the first valve type (FIG. 1*a*).

Also, the valve plug 218 is located further away from the actuator spindle 5 in the second valve type (FIG. 2a) than in the first valve type (FIG. 1a). Finally, it is noted that the valve seat 214 is located further away from the valve plug 218 for the second valve type (FIG. 2a) compared to the relationship between the valve seat 114 and the valve plug 118 of the first valve type (FIG. 1a). Thus, the valve closing member 216 has a larger closing member stroke in valves 200 of the second valve type compared to that of closing members 116 in valves 100 of the first valve type. This also means that the maximum allowable stroke MAS' (see FIG. 2c) of the actuator spindle 5 will be greater when the actuator 1 is connected to the valve 200 of the second valve type than the maximum allowable stroke MAS (see FIG. 1c) when connected to the valve 100 of the first valve type.

The present inventive concept relates to a method of valve type recognition and to an actuator which can be used in such a method.

In order to carry out the inventive method, it is not necessary for the person connecting the actuator to a valve to be aware of which valve type the valve belongs to.

According to at least some embodiments of the inventive method, it is determined if the maximum allowable stroke MAS, MAS' of the actuator spindle 5 is larger than a reference value. The reference value may, for instance, be stored in the control unit.

In at least some example embodiments, the reference value may correspond to the maximum allowable stroke MAS of an actuator spindle 5 in an actuator 1 which is connected to a valve 100 of the first valve type. In other words, the reference value would correspond to the displacement length of the actuator spindle 5 between its first end position E1 (FIG. 1a) and its second end position E2 (FIG. 1c). Suitably, the reference value may be set somewhat larger in order to take into account manufacturing tolerances and minor differences between individual valves belonging to the same valve type.

Thus, in order to determine if the maximum allowable stroke is larger than a reference value, the actuator spindle 5 is moved from one of the first and second end positions in a direction towards the other one of the first and second end positions. If the displacement of the actuator spindle 5 exceeds the reference value, it is determined that the actuator 1 has been connected to a valve 200 of the second valve type shown in FIGS. 2a-2c. However, if the displacement of the actuator spindle 5 equals to or is less than said reference value, then it is determined that the actuator 1 is connected to a valve 100 of the first valve type shown in FIGS. 1a-1c.

Based on the determination of valve type, the actuator control unit 17 is then adapted to make the actuator 1 operate on the valve according to an appropriate operating mode, for instance applying a valve type specific closing force, speed of the actuator spindle and/or the relation between a signal received by the actuator and the applied actuator spindle displacement. For instance, the actuator spindle would exert a lower closing force on the smaller valve 100 in FIGS. 1a-1c than on the larger valve 200 in FIGS. 2a-2c.

The measurement of the displacement of the actuator spindle 5 may, for instance, be done by counting the steps taken by cogs of a gear wheel in the gear arrangement 15, or by measuring rotations of the drive shaft of the motor 13, etc. It would also be conceivable to use one or more sensors (not shown), for example one or more Hall sensors. The actuator spindle 5 could be in the form of a magnetic spindle which could travel through a coil (not shown) whereby depending on the position of the actuator spindle 5 a certain electro motive voltage is induced. Another alternative could be to provide the actuator housing 3 with an optical sensor and the actuator spindle 5 with indicia markings; and as the indicia markings pass by the optical sensor the displacement of the actuator spindle 5 can be sent to the control unit 17.

It should be understood that although it may be suitable to have the reference values stored in the control unit 17, there are other conceivable solutions as well. For instance, the operating modes may be triggered by sensor signals received by the control unit 17. For instance, if there are two Hall sensors in the actuator 1, a first one becoming activated for a short stroke (i.e. when actuator 1 is connected to the first valve type) and the second one becoming activated for a longer stroke (i.e. when the actuator 1 is connected to the second valve type). If the control unit 17 gets a signal from the second sensor, the control unit 17 will switch its operating mode to a second valve type operating mode. In other words, the control unit 17 does not necessarily have to compare if a value is greater than a reference value or not, since this "logic" can be built-in in the presence of the two sensors.

Thus, all of the above examples disclose various means for determining if the maximum allowable stroke of the actuator spindle 5 is larger than a reference value.

It should be understood that in this example only two valve types (FIGS. 1a-1c and FIGS. 2a-2c, respectively) have been compared. However, it should be understood that the actuator 1 may be adapted to be connectable to more than two valve types. In such case the maximum allowable stroke of the actuator spindle 5 will be compared with more reference values, which has already been exemplified previously in this disclosure.

The described first valve 100 of the first valve type in FIGS. 1a-1c, the second valve 200 of the second valve type in FIGS. 2a-2c and the actuator 1 in said figures may form part of a system according to an aspect of the inventive concept. It should be understood that such a system with at least two valves 100, 200 of different valve types may also be realised in combination with a push/pull actuator.

Figure 3:
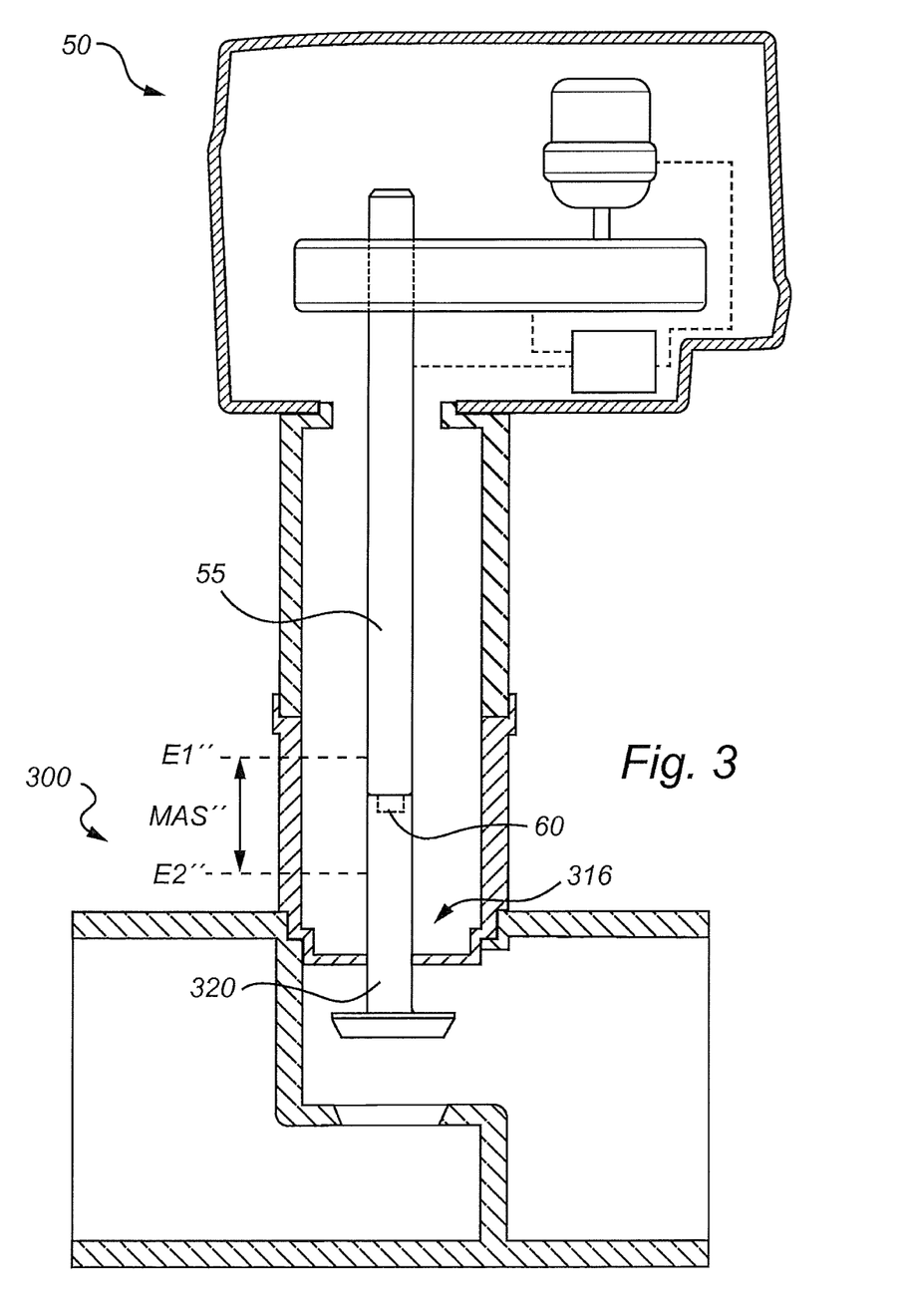
FIG. 3 illustrates schematically a push/pull actuator connected to a valve.

FIG. 3 illustrates schematically a push/pull actuator 50 connected to a valve 300. The valve 300 is illustrated without a biasing spring being present. Instead the actuator 50 will provide both the opening and the closing movement of the valve closing member 316. When a person connects the actuator 50 to the valve 300 the actuator spindle 55 will become coupled to the valve rod 320 via suitable engagement means 60. Accordingly, the actuator spindle 55 will both be able to push the valve rod 320 into a fully closed position and to pull the valve rod 320 into a fully open position. Other than that, the inventive principles can be used in the same way as for the push actuator shown in FIGS. 1a-1c and FIGS. 2a-2c. Thus, the maximum allowable stroke MAS" of the actuator spindle 55 is compared to a reference value (or several reference values if there are more than two valve types that are possible to connect to the actuator). If the maximum allowable stroke MAS" is smaller than or equal to a first reference value it is determined that the connected valve 300 is of a first valve type, otherwise it is of a second or further valve type. It should also be noted for a push/pull actuator 50 (such as in FIG. 3) the second end position E2" is, just like for the push actuator, defined by the position of the actuator spindle 55 when the connected valve rod 320 is in a fully closed position of the valve 300. However, the first end position E1", is not necessarily defined by a mechanical or electrically controlled stop in the actuator 50, but is instead defined by the position of the actuator spindle 55 when the connected valve rod 320 is in the fully open position of the valve 300. In other words, if the valve rod 320 cannot move any further, neither can the rigidly connected actuator spindle 55.

According to the second aspect of the inventive method, the mutual travelling distance of the actuator spindle and the valve rod can be used for determining the valve type. This is true for both a push actuator 1 as in FIGS. 1a-1c and FIGS. 2a-2c and for a push/pull actuator 50 as in FIG. 3. For a push actuator 1, the actuator spindle 5 will be in contact or operatively connected to the valve rod 120, 220 during at least a part of the maximum allowable stroke MAS, MAS' of the actuator spindle. For the push/pull actuator 50 the actuator spindle 55 will be in contact or operatively connected to the valve rod 320 during the entire maximum allowable stroke MAS" of the actuator spindle 55.

In this second aspect, when the actuator has been connected to a valve, the actuator spindle is set in a first reference position. The first reference position may be the first end position (i.e. most retracted position) of the actuator spindle. However, it may be any predefined position proximal to the second end position defined by the first valve type. Suitably, the first reference position is related to the distal end (connecting end) of the actuator spindle. In FIG. 1c the first reference position P1 has been predefined as a position of the distal end 9 of the actuator spindle 5 when the valve 100 of the first valve type is in an intermediate position between being fully open and fully closed. The first reference position P1 may suitably be detected by a sensor or by counting the steps of a gear in the gear arrangement 15 from a fully retracted position of the actuator spindle 5.

Next, the actuator spindle 5 is moved away from the first reference position P1 in a direction towards a second reference position. This second reference position may be either in a closing/advancing/distal direction, herein illustrated as P2, or in an opening/retracting/proximal direction, herein illustrated as P2'.

If the second reference position is predefined to be in the closing direction, i.e. position P2, it may suitably be at the second end position E2 (or slightly beyond) of the actuator spindle 5. Thus, if the actuator spindle 5 is not able to move past the second reference position P2, it is determined that the connected valve is of a first valve type, otherwise it is of a second or further valve type.

If the second reference position is predefined to be in the opening direction, i.e. position P2', then if the actuator spindle 5 leaves the valve rod when being retracted beyond said second reference position P2', it is determined that the valve is of the first valve type. However, if the actuator spindle is still connected to the valve rod when being retracted beyond the second reference position (e.g. the state shown in FIG. 2b) it is determined that the valve is of the second or further valve type. The control unit 17 may be used to detect whether or not the motor works against the force of the biasing spring 122 or not, thus being able to detect whether or not the actuator spindle 5 is connected to the valve rod.

It should be noted that, if the valve recognition is only intended to be made by a retracting movement, i.e. in a direction towards the first end position E1, then the first reference position P1 may be located at a more advanced distal position, such as at second end position E2, or even more distally (in such case if the first reference position P1 is not detected, it can be determined that the actuator is connected to a valve of the second or further valve type).

It should be understood that the use of reference positions may be implemented also for the push/pull actuator 50 in FIG. 3.

Furthermore, it should be understood that this aspect may also be used even if the two valve types to be distinguished between would have the valve seat positioned at the same distance from the connected actuator (or if the location of the valve seat would be adjustable). The second reference position P2' could still be applied to distinguish between the valve types, irrespective of the available stroke of the valve closing member (potentially limited by setting the valve seat location).

It should be understood that the valves and actuators illustrated in the drawings may be used in any one of the first, second, third, fourth and fifth aspects of the present inventive concept.

The invention claimed is:

1. A method for valve type recognition of a valve connected to an actuator configured to be used in a first valve type or second valve or further valve type, said valve having a valve rod movable by a separate actuator spindle of the actuator, said valve being one of the first valve type or the second or further valve type, wherein said actuator spindle of the connected actuator has a maximum allowable stroke defined by a displacement of the actuator spindle between a first end position and a second end position, said second end position being defined as the position of the actuator spindle when being non-positively connected to said valve rod in a fully closed position of the valve, said actuator and said valve being separate components, said method comprising the steps of:
connecting the actuator to the valve so that the actuator spindle is non-positively connected to the valve rod,
determining for the connected actuator if the maximum allowable stroke of the actuator spindle is larger than a predetermined reference value,
determining that the valve connected to the actuator is of the first valve type if the maximum allowable stroke of the actuator spindle is the same, or smaller than, said reference value,
determining that the valve connected to the actuator is of a second or further valve type if the maximum allowable stroke of the actuator spindle is larger than said reference value.

2. A method according to claim 1, wherein said step of determining if the maximum allowable stroke of the actuator spindle is larger than a reference value is preceded by the step of:
determining for the first valve type, a first type maximum allowable stroke of the actuator spindle between said first and said second end positions, the first type maximum allowable stroke being the same as, or smaller than, said reference value.

3. A method according to claim 1, further comprising the step of:
determining in said second end position and for the first valve type, a reference position of an end surface of the valve rod being in contact with said actuator spindle.

4. A method according to claim 3, further comprising the step of:
for the second valve type, moving said actuator spindle past said reference position.

5. A method according to claim 1, wherein said first end position is a top end position.

6. A method according to claim 1, wherein said second end position is a bottom end position.

7. A method according to claim 1, further comprising the step of:
operating the actuator in a first mode of operation if the maximum allowable stroke of the actuator spindle is the same, or smaller than, said reference value.

8. A method according to claim 1, further comprising the step of:
operating the actuator in a second mode of operation if the maximum allowable stroke of the actuator spindle is larger than said reference value.

9. A method according to claim 1, wherein said reference value is a reference stroke.

10. An actuator for controlling a valve, said actuator and said valve being separate components, said actuator comprising:
an actuator spindle configured to be non-positively connected to a valve rod of the valve,
wherein, when said actuator is connected to the valve, said actuator spindle is arrangeable in a first end position and in a second end position, said second end position being defined as the position of the actuator spindle when being non-positively connected with the valve rod in a fully closed position of the valve, wherein the maximum allowable stroke for the actuator when connected to the valve is defined by a displacement of the actuator spindle between the first end position and the second end position;
means for determining if the maximum allowable stroke of the actuator spindle is larger than a predetermined reference value.

11. The actuator as claimed in claim 10, wherein the actuator is adapted to:
operate in a first mode of operation if the determined maximum allowable stroke of the actuator spindle is the same, or smaller than, said reference value,
operate in a second mode of operation if the maximum allowable stroke of the actuator spindle is larger than said reference value.

12. The actuator as claimed in claim 11, wherein
in said first mode of operation the actuator is adapted to apply via the actuator spindle a first force to the valve rod, and
in said second mode of operation the actuator is adapted to apply via the actuator spindle a second force to the valve rod,
wherein said second force is greater than said first force.

13. The actuator as claimed in claim 11, wherein
in said first mode of operation the actuator is adapted to apply at least one of
a first speed of the actuator spindle,
a first control signal to actuator displacement function, and
in said second mode of operation the actuator is adapted to apply at least one of
a second speed of the actuator spindle,
a second control signal to actuator displacement function.

14. The actuator as claimed in claim 11, wherein said means for determining comprises a control unit in which said reference value is stored, wherein the control unit is adapted to control the actuator to operate in one of said first and second modes of operation depending on the determined maximum allowable stroke.

15. The actuator as claimed in claim 10, wherein said means for determining comprises a control unit in which said reference value is stored.

* * * * *